United States Patent
Carmen

Patent Number: 6,154,134
Date of Patent: Nov. 28, 2000

[54] HEAD ACTIVATED VEHICLE HORN CONTROLLER

[76] Inventor: Norman Carmen, 4101 Powder Mill Rd., Beltsville, Md. 20705

[21] Appl. No.: 09/354,156

[22] Filed: Jul. 16, 1999

[51] Int. Cl.[7] .................................................. G08B 13/18
[52] U.S. Cl. .......................... 340/556; 340/540; 340/555; 70/257
[58] Field of Search ..................... 340/575, 576, 340/540, 555, 556, 439; 70/257

[56] References Cited

U.S. PATENT DOCUMENTS

| | | | |
|---|---|---|---|
| 5,691,693 | 11/1997 | Kithil | 340/439 |
| 5,887,466 | 3/1999 | Yoshizawa | 70/257 |
| 5,923,256 | 7/1999 | Satake et al. | 340/575 |
| 5,937,092 | 8/1999 | Wootton et al. | 382/192 |
| 5,952,928 | 9/1999 | Washington et al. | 340/575 |
| 5,969,616 | 10/1999 | Tschoi | 340/576 |
| 5,990,795 | 11/1999 | Miller | 340/576 |

*Primary Examiner*—Jeffery A. Hofsass
*Assistant Examiner*—Phung Nguyen
*Attorney, Agent, or Firm*—Venable, Baetjer, Howard & Civiletti, LLP; Andrew C. Aitken

[57] ABSTRACT

A vehicle horn activation system which is triggered by the forward movement of the vehicle operator's head. An array of light sources and photo detectors create a light curtain which is positioned in a location that allows the driver to move his head into the light curtain, thereby interrupting the emitted light. When the light curtain is broken a signal is generated which activates the horn.

6 Claims, 2 Drawing Sheets

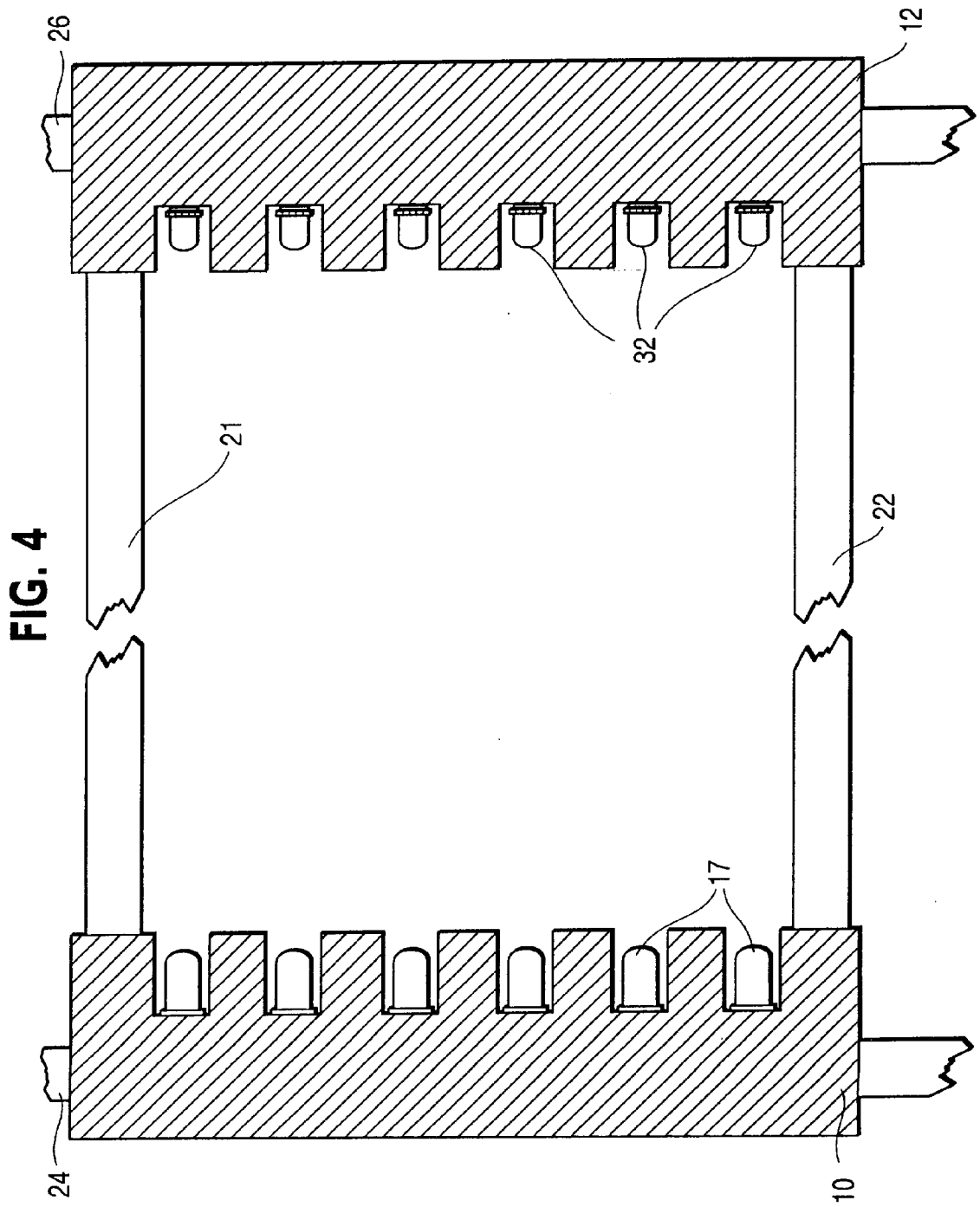

HEAD ACTIVATED VEHICLE HORN CONTROLLER

The present invention relates to a device used to activate a conventional automobile horn.

BACKGROUND OF THE INVENTION

Most horns on automobiles and trucks employ pressure activated switches located either in the center of the steering column or at some other location within the interior region of a steering wheel. In order to activate conventional horn devices, an operator must remove his or her hand from the steering wheel in order to engage the pressure-activated switch. Some drivers are reluctant to remove their hands from the wheel, especially in a dangerous driving situation where it may be desirable to sound the horn. Removing a hand from the steering wheel may diminish the optimal control of the vehicle during a hazardous situation and could actually exacerbate an already dangerous driving condition. For example, in the event a car is drifting into a driver's lane on a high speed expressway, a driver may optimally want to simultaneously sound the horn to communicate the problem to the errant driver and undertake evasive steering maneuvers.

In view of this problem, some automobiles have located horn switches near the annular periphery of the wheel, such as on a rim located circumferentially inside the wheel. Other designs have provided a pressure-activated switch near the circumference of the wheel on the radial arms connecting the wheel to the steering column or central axis upon which the wheel is mounted. At these locations, the horn switch can be manipulated by the thumbs or fingers, depending on the location of the drivers hands on the wheel, without removing the hands from the steering wheel. Although these alternatives allow the simultaneous manipulation of both the wheel and the horn, full control over the wheel is compromised when the horn is activated. Any horn location which diminishes an operator's optimal control over the vehicle by reducing the control over the wheel, and particularly in situations where a severe or sudden turn of the wheel is required, is undesirable. Moving the horn from a central location of the steering wheel has other disadvantages because in the event of an emergency, many drivers impulsively or instinctively hit the center of the wheel to activate the horn. Moving the horn from the center of the steering column may result in the driver experiencing some difficulty in locating the horn, particularly when the driver is unfamiliar with the vehicle. Although many auto manufactures locate the horn activation switch on the steering wheel, the exact location differs depending on the particular model or make of the automobile. The incorporation of air bags has further influenced and limited the location of the horn on an automobile, requiring the horn to be moved from the center position.

SUMMARY OF THE INVENTION

The present invention provides a supplemental controller for a horn which can be activated by movement of the head of a driver into a predetermined area thereby allowing a driver to sound the horn while maintaining his or her hands on the steering wheel. In addition to instinctively reaching for the center of a steering wheel, in the event a driver encounters a dangerous condition, they will also frequently move their head forward in order to improve the visibility of the immediate road conditions and focus on the events unfolding on the roadway. The present invention takes advantage of this instinctive reflex exhibited by many drivers by providing a device to sense this forward movement of the head and body. In this regard, in hazardous driving conditions, drivers will frequently increase the pressure of their grip on the steering wheel and lean forward in order to increase their peripherial vision of the road. Obviously, the horn switch may also be activated by the deliberate forward movement of the head into a predetermined region. In the event the driver's head move forward past a predetermined point, a switch is activated to sound the horn. In an alternative embodiment of the invention, the horn is activated by the forward motion of the head. The present invention is designed to work as an adjunct to conventional horn switches so that the horn can also be activated by the driver in the conventional manner.

One feature of the invention is that it provides an alternative location to activate the horn which can be incorporated in different makes and models of cars. Providing an adjunct location further assists a driver to quickly and effortlessly locate the horn during a time of an emergency. A further feature of the present invention takes advantage of the instinctive or reflexive motion of a driver which occurs when a driver encounters a potential emergency situation or dangerous road condition. The present invention further provides a manner in which to activate a horn which does not require the removal of the hands from the steering wheel.

BRIEF DESCRIPTION OF THE DRAWINGS

FIG. 4 sectional view of the light source and light sensor assembly.

DETAILED DESCRIPTION OF THE INVENTION

Figure 1:
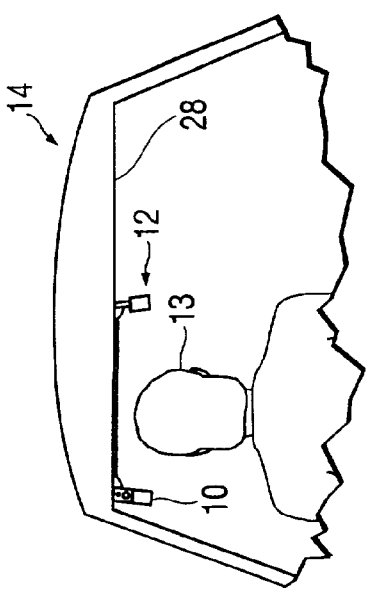
FIG. 1 is a rear view of a sensor device according to the invention installed in the driver's side of a vehicle.
Figure 2:
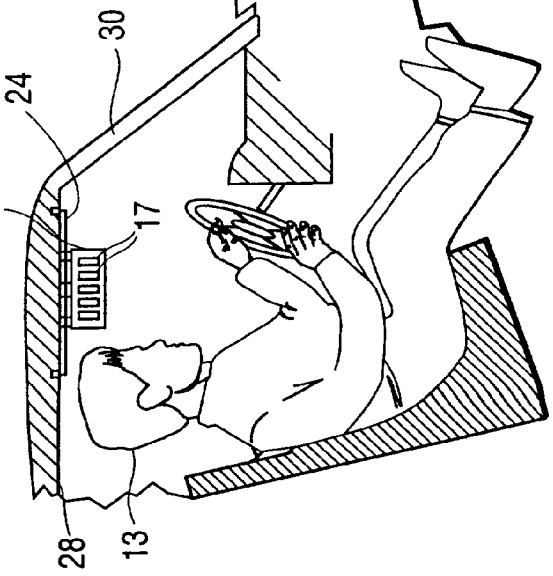
FIG. 2 is a side view of the device depicted in FIG. 1 showing the relationship between the device and a driver's head within a vehicle.

Now referring to FIG. 1, the present invention involves providing an electric eye such as an array 10 of light sources 17 and a series of opposite photo detectors 12, which are positioned on opposite sides of a driver's head 13 within the passenger compartment of a vehicle 14. Between the array of light sources 10 and photo detectors 12, a light curtain is created where light is generated by the light sources and is detected by the opposite detectors when the device has been activated. Now referring to FIG. 2, activation of the device is affected by the movement of the driver's head 13 forward toward the windshield 30 and into or though one of the light beam created by the light emitters 17.

Figure 3:
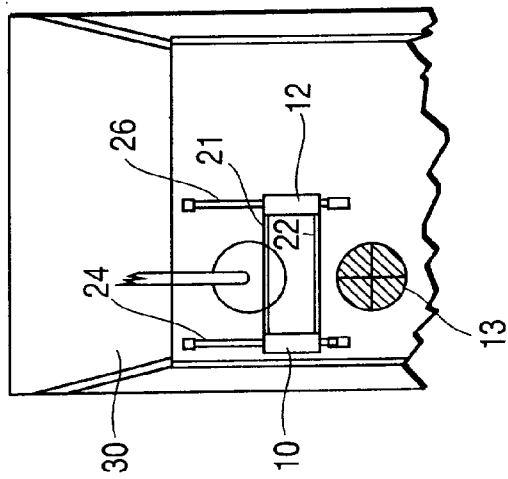
FIG. 3 is a bottom view of a sensor device shown mounted on a roof of a vehicle.

As best seen in FIG. 3, the light-emitting elements and light detection elements are connected to each other by stabilizer brackets 21 and 22 which maintain the spacial relationship between each emitter and detector element which make up the electric eye. The location of the emitters and detectors can also be adjusted to conform to the physical dimensions of the particular driver of the vehicle by sliding the assembly along rods 24 and 26 which are attached to the lower surface 28 of the vehicle's roof. The detector assembly can also be adjusted in a vertical direction by adjusting the distance rods 24 and 26 extend from the lower surface 28 of the vehicle's roof. Therefore, the location of the detector assembly can be adjusted to optimally conform to the physical dimensions of any driver. The position of the light curtain is adjusted so it may be interrupted by any driver's forward motion.

As seen in FIG. 4, the light sources 17 within the array 10 consist of a series of light-emitting diodes 17. Opposite each diode is a photo detector 32 which consists of a photo transistor that generates a voltage in response to light impinging on the detector. In a first embodiment, the device employs light-emitting diodes; however, the light sources may be selected from a wide variety of devices, including lasers or conventional light bulbs. Likewise, the wavelength of the light emitted by the light sources may be within the visible spectrum or be within the infra-red or ultraviolet regions. For example, in a further contemplated embodiment, the light source emits an infra red light and the detectors are selected to specifically detect radiation in this wavelength and generate a signal in response thereto. In other contemplated embodiments, light from the light source is focused in a beam by a lens or reflector system towards the opposite photo transistor. In yet a further embodiment, the light source is a low powered laser.

Figure 5:
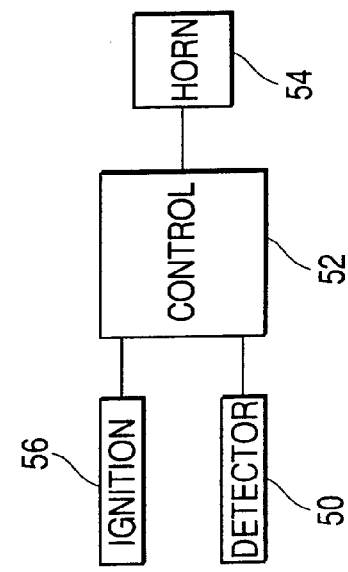
FIG. 5 is a schematic representation of the circuit of the invention.

FIG. 5, a schematic drawing of the invention, shows the component of the system, which include the detector assembly 50, a control circuit or controller 52, a horn 54 and the ignition 56. The control circuit 52 or micro processor receives the signal from the photo detectors of the detector assembly 50 and provides an output to control the operation of the horn. Controller 52 can either be a part of a vehicle's existing microprocessor or be provided as an aftermarket device comprising an amplifier and relay. In operation, the controller 52 first receives an input from the ignition 52 to energize the array of lights on the light source. Next, the controller looks for an input signal from the detector assembly 50 and establishes the signal received as a baseline. In the event the path of light going to one of the photo detectors is interrupted, the nature of the signal from the light detectors will change and the controller 52 or microprocessor will detect the interruption and activate the horn. In the first embodiment, controller 52 activates the horn for a predetemined time period using a timer and then deactivates the horn. The controller will then continue to monitor the output from detector 50 and, in the event the signal is again detected, the controller enables the horn to be activated again by the interruption of the light beam. In an alternative embodiment of the invention, the activation of the horn will continue until the controller detects the presence of a signal from the detector reflecting that the beam is no longer interrupted. When the ignition is turned off, the controller no longer recognizes input from the detector. Although in the foregoing embodiment the controller is activated by the vehicle's ignition, in a further contemplated embodiment the activation of the controller and detector assembly may be affected by a separate switch that is provided.

Although in the first embodiment a light curtain is employed to detect the forward motion of the head by its interference with a light beam or a series of beams which form a curtain, it is further contemplated that a wide variety of detection methods would also be effective to detect the forward motion of the head and activate the horn. In this regard, as noted above, it is contemplated that other remote motion detector devices may also be employed to detect the position of the driver's head within a vehicle such as those that detect light in other manners or employ ultrasonic sound waves. Thus, commercially available motion detector technologies such as ultrasonic detectors, infra-red cameras or other optical detection methods can also be adapted for the application disclosed herein. In this regard, commercially available ultrasonic devices sense motion by comparing the doppler shifted wave reflected by a moving object with the original wave created by the device. Any frequency change is accompanied by a continuous phase change between the two waves, which is sensed and ultimately, by employing a relay to switch to higher voltage loads, the signal can be used to activate a horn. The placement of ultrasonic devices with respect to a driver's head may differ from the placement of optical detectors because objects moving toward or away from the device are detected. Moving an object across an ultrasonic detection device may not cause a doppler shift, and therefore may not set off the horn.

A further alternative motion detection device contemplated for use with the invention involves a simple optical method using a camera and dividing an image in the selected area into regions of fixed size and then compare corresponding regions in successive images for changes. Changes in luminance, grayscale or colors may be detected with varying accuracy depending on the processing capabilities of a microprocessor or the output of the camera used to acquire the image.

Although a number of specific embodiments have been described herein, those having skill in the art will appreciate that there are additional arrangements and applications employing the invention which may be substituted for the specific disclosure as described herein. In particular, other remote motion detection methods may be employed for the detection of the forward movement of the head. Having thus described the present invention and its preferred embodiment in detail, it will be readily apparent to those skilled in the art that further modifications to the invention may be made without departing from the spirit and scope of the invention as presently claimed.

I claim:

1. A system to activate a horn on a vehicle comprising detection means to remotely detect the forward motion of a driver's head toward a windshield and generate a signal, and means to cause said signal to activate said horn, wherein said detection means further comprises an electric eye assembly, said electric eye assembly comprising a light source and opposite photo detector, said light source and said photo detector positioned on opposite sides of said drivers head thereby creating a light beam extending in front of a driver's head when said driver is seated in an upright position, wherein when said driver's head interrupts said beam, a signal is generated by said photo detector which activates said horn.

2. The assembly as recited in claim 1 wherein said electric eye assembly comprises a plurality of opposite light sources and a plurality of opposite photo detectors, said light sources and said opposite photo detectors positioned to form a light curtain wherein when said head of said driver traverses said light curtain a signal is generated which actives said horn.

3. The assembly as recited in claim 2 wherein said light sources and said light detectors are oriented in a single plane.

4. The device as recited in claim 1 further comprising adjustment means wherein the location of said electric eye may be adjusted with respect to the position of a driver's head.

5. The assembly as recited in claim 1 wherein said light source emits light in the infra-red wavelength and said light detector detects said infra red light.

6. The assembly as recited in claim 2 wherein said light detector comprises a photo transistor.

* * * * *